(12) United States Patent
Kita (10) Patent No.: US 9,387,894 B2
(45) Date of Patent: Jul. 12, 2016

(54) CRAWLER BELT COUPLING APPARATUS (71) Applicant: Naoaki Kita, Hirakata (JP)

(72) Inventor: Naoaki Kita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 96 days.

(21) Appl. No.: 14/353,919

(22) PCT Filed: Dec. 21, 2012

(86) PCT No.: PCT/JP2012/083248
§ 371 (c)(1),
(2) Date: Apr. 24, 2014

(87) PCT Pub. No.: WO2013/175667
PCT Pub. Date: Nov. 28, 2013

(65) Prior Publication Data
US 2014/0306517 A1    Oct. 16, 2014

(30) Foreign Application Priority Data

May 24, 2012    (JP) ................................ 2012-118573

(51) Int. Cl.
*B62D 55/21* (2006.01)
*B62D 55/32* (2006.01)

(52) U.S. Cl.
CPC ................ *B62D 55/21* (2013.01); *B62D 55/32* (2013.01)

(58) Field of Classification Search
CPC .... B62D 55/21; B62D 55/213; B62D 55/202; B62D 55/211
USPC ................................................. 305/202, 204
See application file for complete search history.

(56) References Cited

U.S. PATENT DOCUMENTS

| | | | |
|---|---|---|---|
| 3,958,836 A * | 5/1976 | Brown ................. | B62D 55/092 305/118 |
| 4,618,190 A | 10/1986 | Garman et al. | |
| 5,069,509 A * | 12/1991 | Johnson ............. | B62D 55/0887 305/104 |
| 5,201,171 A * | 4/1993 | Anderton ............. | B62D 55/205 29/517 |
| 5,257,858 A * | 11/1993 | Taft ........................ | B62D 55/21 305/104 |
| 6,206,491 B1* | 3/2001 | Hisamatsu ........... | B62D 55/088 305/103 |
| 6,564,539 B2* | 5/2003 | Bedford ................. | B21K 25/00 29/517 |
| 7,354,200 B2* | 4/2008 | Yamamoto ............. | B62D 55/15 305/202 |
| 8,113,597 B2* | 2/2012 | Grenzi ................... | B62D 55/21 277/381 |
| 8,991,944 B2* | 3/2015 | Hisamatsu ......... | B62D 55/0887 305/104 |

(Continued)

FOREIGN PATENT DOCUMENTS

| CN | 201961403 U | 9/2011 |
|---|---|---|
| CN | 102282062 A | 12/2011 |

(Continued)

*Primary Examiner* — Jeffrey J Restifo
(74) *Attorney, Agent, or Firm* — Drinker Biddle & Reath LLP (57) ABSTRACT

In a crawler belt coupling apparatus, a first crawler belt link has a first through hole, and a first cutout in an inner circumferential surface of a first through hole. A master pin is inserted in the first through hole of the first crawler belt link, and has a second cutout in an outer circumferential surface thereof. A first recess is constructed of the first cutout and the second cutout, and has an opening at an end portion of the first through hole. A first knock pin is disposed such that one end surface thereof faces the opening. A first snap ring has a C-like shape, and is disposed to be separated from the one end surface of the first knock pin with a space therebetween or disposed in abutment with the one end surface.

6 Claims, 12 Drawing Sheets

(56) References Cited

U.S. PATENT DOCUMENTS

| | | | | |
|---|---|---|---|---|
| 2002/0131817 A1* | 9/2002 | Yamamoto | ............ | B62D 55/21 403/272 |
| 2003/0219181 A1* | 11/2003 | Yamamoto | ............ | B62D 55/15 384/322 |
| 2008/0073972 A1* | 3/2008 | Mulligan | ........... | B62D 55/0887 305/203 |
| 2008/0265667 A1* | 10/2008 | Livesay | ................ | B62D 55/21 305/202 |
| 2010/0090523 A1* | 4/2010 | Grenzi | .................. | B62D 55/21 305/104 |
| 2012/0056472 A1* | 3/2012 | Grenzi | .................. | B62D 55/21 305/104 |
| 2012/0068530 A1* | 3/2012 | Grenzi | .................. | B62D 55/21 305/104 |
| 2013/0169034 A1* | 7/2013 | Hisamatsu | ........ | B62D 55/0887 305/103 |
| 2014/0306517 A1* | 10/2014 | Kita | ...................... | B62D 55/32 305/204 |
| 2015/0061374 A1* | 3/2015 | Diekevers | ............. | B62D 55/21 305/202 |

FOREIGN PATENT DOCUMENTS

| | | |
|---|---|---|
| EP | 0138838 B1 | 12/1986 |
| JP | S60-500761 A | 5/1985 |
| JP | S62-023879 A | 1/1987 |
| JP | s65-1078 U | 1/1989 |
| JP | H7-13674 U | 3/1995 |
| JP | 2010-268537 A | 11/2010 |
| KR | 2019890001641 Y1 | 3/1989 |
| KR | 1020020000560 A | 1/2002 |
| WO | WO-84/03676 A1 | 9/1984 |
| WO | WO 2012/073956 A1 | 6/2012 |

* cited by examiner

CRAWLER BELT COUPLING APPARATUS

TECHNICAL FIELD

The present invention relates to a crawler belt coupling apparatus, in particular, a crawler belt coupling apparatus including a master pin.

BACKGROUND ART

A hydraulic excavator, a bulldozer, and the like, each of which includes a crawler belt, have been known as work vehicles. The crawler belt includes a crawler belt link chain in which a plurality of crawler belt links are coupled to one another. When detaching/attaching the crawler belt from/to the traveling apparatus, the crawler belt link chain is decoupled. An exemplary technique of decoupling the crawler belt link chain is to detach a master pin, which connects crawler belt links to each other, from the crawler belt link.

In this technique, when the master pin is pressed into the crawler belt link with interference fit, a pressing machine is required to detach/attach the master pin from/to the crawler belt link. Thus, such a pressing machine is required to detach/attach the crawler belt from/to the traveling apparatus in a work site. This results in poor workability in attaching/detaching the crawler belt in the work site.

For example, Japanese Utility Model Laying-Open No. 64-1078 (Patent Document 1) proposes an apparatus permitting detachment/attachment of a master pin from/to a crawler belt link and including a retaining pin to prevent the master pin from coming off from the crawler belt link. In this structure, the retaining pin is withdrawn/inserted to detach/attach the master pin from/to the crawler belt link without using a pressing machine.

In addition, in this apparatus, a brim is provided at one end of the master pin and the retaining pin is inserted into the other end thereof. Further, the crawler belt link is provided with a locking boss, which is engaged with the brim of the master pin. With the engagement between the brim of the master pin and the locking boss of the crawler belt link, the master pin can be suppressed from being turned according to the crawler belt link.

CITATION LIST

Patent Document

PTD 1: Japanese Utility Model Laying-Open No. 64-1078

SUMMARY OF INVENTION

Technical Problem

When the crawler belt of the apparatus described in the above-described publication is used, the corner portion of the brim of the master pin is brought into contact with the locking boss of the crawler belt link, with the result that the locking boss is worn out. This provides a large space between the locking boss of the crawler belt and the brim of the master pin. Accordingly, the master pin is turned according to the crawler belt link. Moreover, the master pin is likely to come off from the crawler belt link.

The present invention has been made in view of the foregoing problem, and has an object to provide a crawler belt coupling apparatus capable of improving workability in detaching/attaching a crawler belt and capable of avoiding the master pin from falling off from the crawler belt link.

Solution to Problem

A crawler belt coupling apparatus of the present invention is a crawler belt coupling apparatus for providing an endless crawler belt by coupling a belt-like crawler belt having a series of crawler belt links. This apparatus includes a first crawler belt link, a master pin, a first knock pin, a first recess, and a first snap ring. The first crawler belt link has a first through hole and a first cutout in an inner circumferential surface of the first through hole. The master pin is inserted in the first through hole of the first crawler belt link and has an second cutout in an outer circumferential surface thereof. The first recess is constructed of the first and second cutouts and has an opening at an end portion of the first through hole. The first knock pin is disposed such that one end surface thereof faces the opening. The first snap ring has a C-like shape and is disposed to be separated from the one end surface of the first knock pin with a space therebetween or disposed in abutment with the one end surface.

According to the crawler belt coupling apparatus of the present invention, the first snap ring has the C-like shape, so that the first snap ring can be readily detached/attached from/to the master pin. By detaching/attaching the first snap ring, the master pin can be detached/attached from/to the first crawler belt link. Accordingly, the master pin can be detached/attached from/to the first crawler belt link without using a pressing machine. In this way, workability can be improved in detaching/attaching the crawler belt.

Further, the first knock pin is disposed in the first recess constructed of the first cutout of the first crawler belt link and the second cutout of the master pin. Accordingly, the master pin can be prevented from rotating relative to the crawler belt link, thereby suppressing the master pin from falling off from the first crawler belt link. Further, the first knock pin has one end surface disposed to face the opening of the first through hole, thereby facilitating an operation of inserting/withdrawing the knock pin.

Further, the first snap ring is fixed to sandwich the first knock pin between the first snap ring and the bottom portion of the first recess. In this way, the first snap ring can prevent the first knock pin from coming off from the first recess. In this way, the first knock pin can be prevented from coming off and the master pin can be prevented from falling off from the first crawler belt link.

Further, a first circumferential groove is provided in the outer circumferential surface of the master pin, and the first snap ring is fitted in the first circumferential groove.

According to the crawler belt coupling apparatus of the present invention, the first snap ring can be securely fixed at a predetermined location, so that the master pin can be prevented from falling off.

Further, the master pin is engaged with the first through hole of the first crawler belt link through intermediate fit.

According to the crawler belt coupling apparatus of the present invention, the master pin can be detached/attached from/to the first crawler belt link without using the pressing machine.

The crawler belt coupling apparatus includes a second crawler belt link forming a pair with the first crawler belt link, a second knock pin, and a second snap ring. The second crawler belt link has a second through hole into which the master pin is inserted, and has a third cutout in an inner surface of the second through hole. The first crawler belt link is disposed at one end side of the master pin and the second crawler belt link is disposed at the other end side of the master pin. The master pin has a fourth cutout and a second circumferential groove in the outer circumferential surface. The second knock pin is disposed in a second recess that is constructed of the third and fourth cutouts and that has an opening at an end portion of the second through hole, the second knock pin being disposed such that the other end surface thereof faces the opening. The second snap ring has a C-like shape and is disposed to be separated from the other end surface of the second knock pin with a space therebetween or disposed in abutment with the other end surface.

According to the crawler belt coupling apparatus, the first crawler belt link is disposed at one end of the master pin and the second crawler belt link is disposed at the other end of the master pin. By detaching/attaching the second snap ring, the master pin can be detached/attached from/to the second crawler belt link. Accordingly, the second knock pin can be detached/attached from/to the second crawler belt link without using a pressing machine. Hence, workability can be improved in detaching/attaching the crawler belt from/to both the first and second crawler belt links.

Further, the second knock pin is disposed in the second recess constructed of the third cutout of the second crawler belt link and the fourth cutout of the master pin. Accordingly, the master pin can be prevented from rotating relative to the second crawler belt link, thereby suppressing the master pin from falling off from the second crawler belt link.

Further, the second snap ring is disposed to be separated from the other end surface of the second knock pin with a space therebetween, or is disposed in abutment with the other end surface of the second knock pin. In this way, the second snap ring prevents the second knock pin from coming off from the second recess. Accordingly, the second knock pin can be prevented from coming off and the master pin can be prevented from falling off from the second crawler belt link.

The first crawler belt link of the crawler belt coupling apparatus includes a first through hole at its one end side and a third through hole at the other end side in the longitudinal direction. The first recess is provided at a site closest to the third through hole of the first through hole. This suppresses cracks from being generated due to the stress around the first recess.

In the crawler belt coupling apparatus, the first knock pin has a uniform shape in cross section perpendicular to the direction of axis from one end to the other end thereof in the direction of axis. Accordingly, the first knock pin can be uniformly in contact with the first recess in the direction of axis. This leads to suppression of wear of the first recess.

In the crawler belt coupling apparatus, the first knock pin has a cylindrical shape. The cylindrical shape allows for surface contact with the first recess. This leads to suppression of wear of the first recess.

Advantageous Effects of Invention

As described above, according to the present invention, workability can be improved in detaching/attaching the crawler belt and the master pin can be avoided from falling off from the crawler belt link.

DESCRIPTION OF EMBODIMENTS

The following describes an embodiment of the present invention based on figures.

Described first is a configuration of a vehicle in one embodiment of the present invention. In the description below, a hydraulic excavator will be described as one exemplary vehicle to which a concept of the present invention can be applied. However, the present invention can be also applied to a track-laying vehicle other than the hydraulic excavator, such as a bulldozer.

Figure 1:
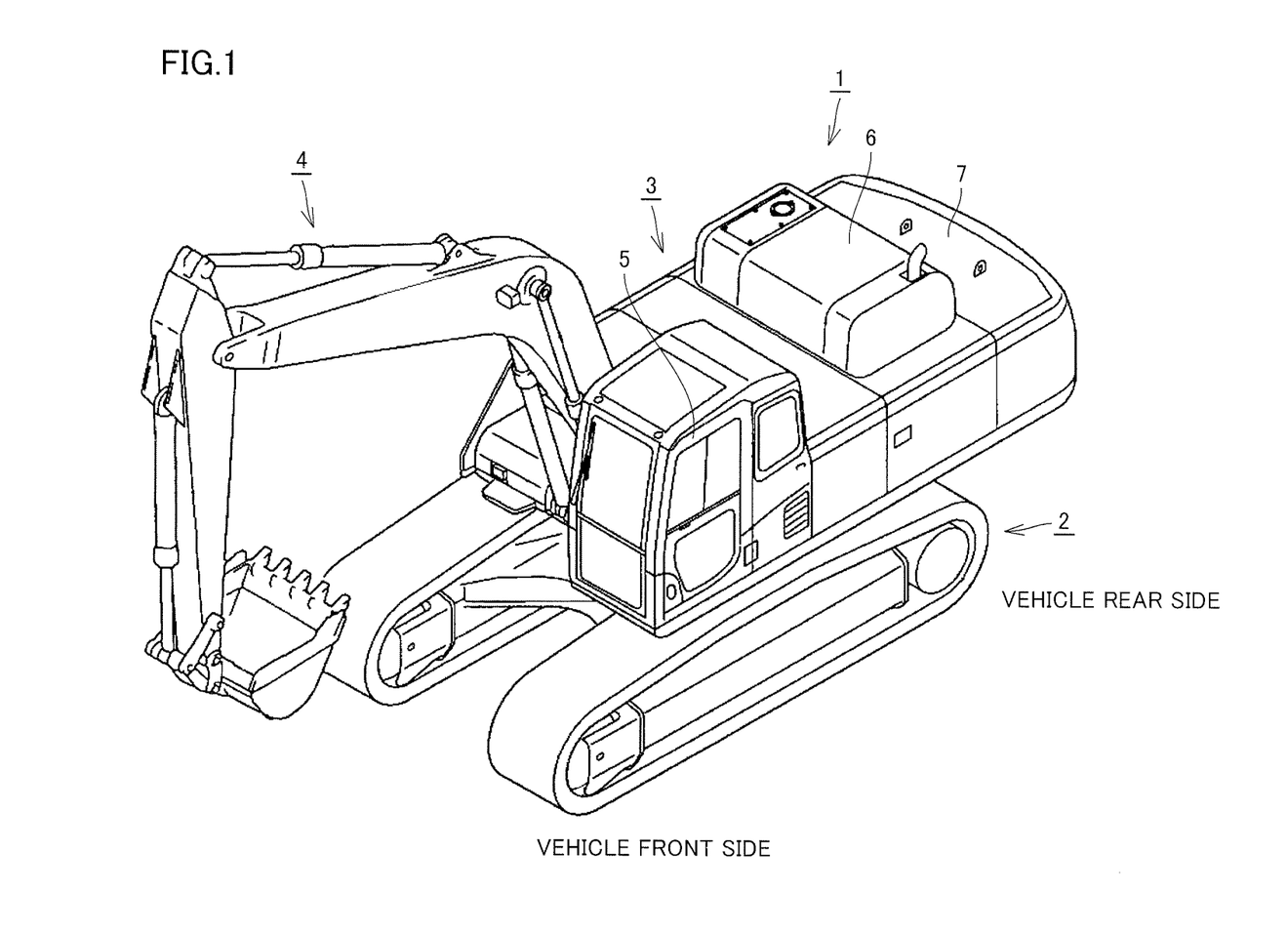
FIG. 1 is a perspective view schematically showing a configuration of a work vehicle in one embodiment of the present invention.

Referring to FIG. 1, work vehicle (hydraulic excavator) 1 mainly includes a lower traveling unit 2, an upper revolving unit 3, and a work implement 4. Lower traveling unit 2 is configured to be capable of traveling autonomously as described below in detail. Upper revolving unit 3 is installed rotatable about lower traveling unit 2. Work implement 4 is pivotably arranged at the front side of upper revolving unit 3 to move up/down. This work implement 4 includes a boom, an arm, a bucket, hydraulic cylinders, and the like, for example.

Lower traveling unit 2 and upper revolving unit 3 mainly form the work vehicle main body. Upper revolving unit 3 includes a cab 5 at the front left side (vehicle front side). At the rear side (vehicle rear side), upper revolving unit 3 includes an engine compartment 6 having an engine contained therein, and a counter weight 7. Here, the front, rear, left, and right sides of the vehicle are defined on the basis of the operator who sits in cab 5.

Figure 2:
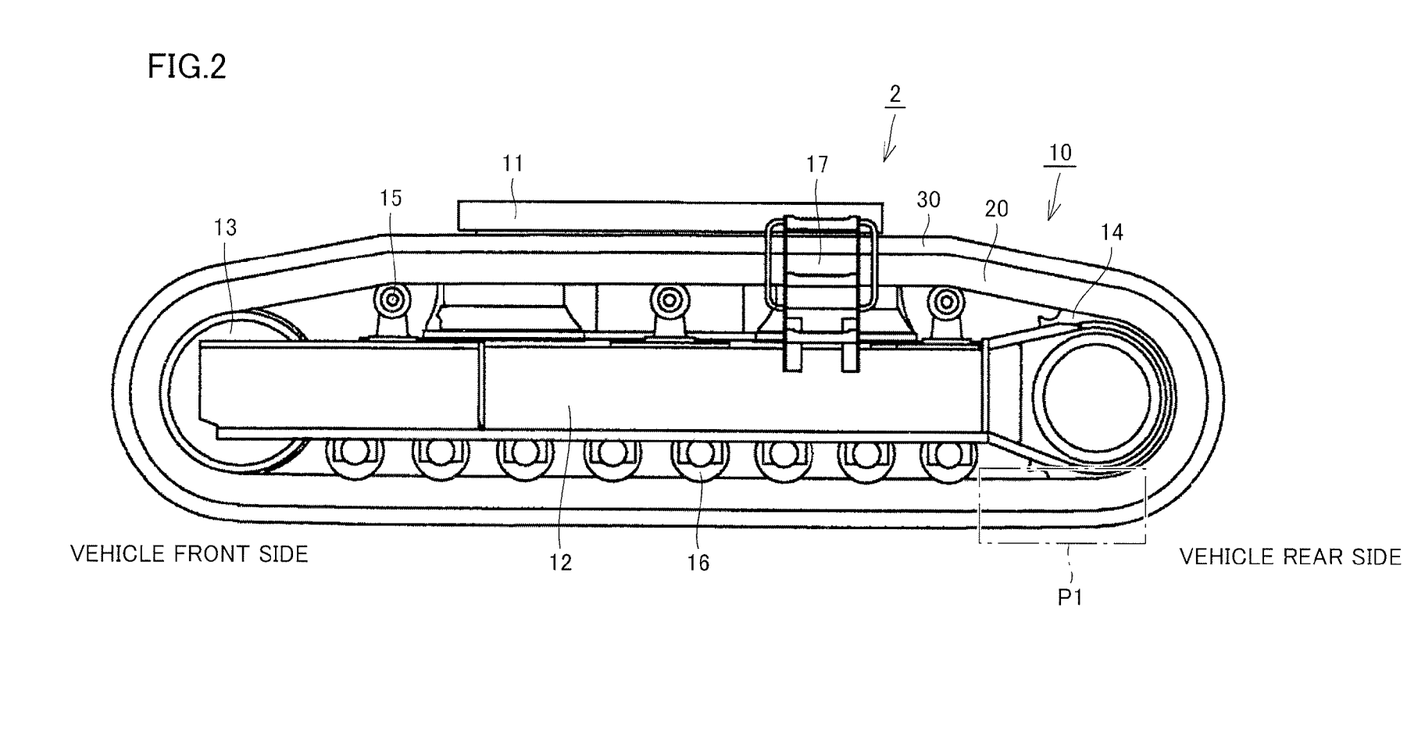
FIG. 2 is a side view schematically showing a configuration of a lower traveling unit of the work vehicle in one embodiment of the present invention.
Figure 3:
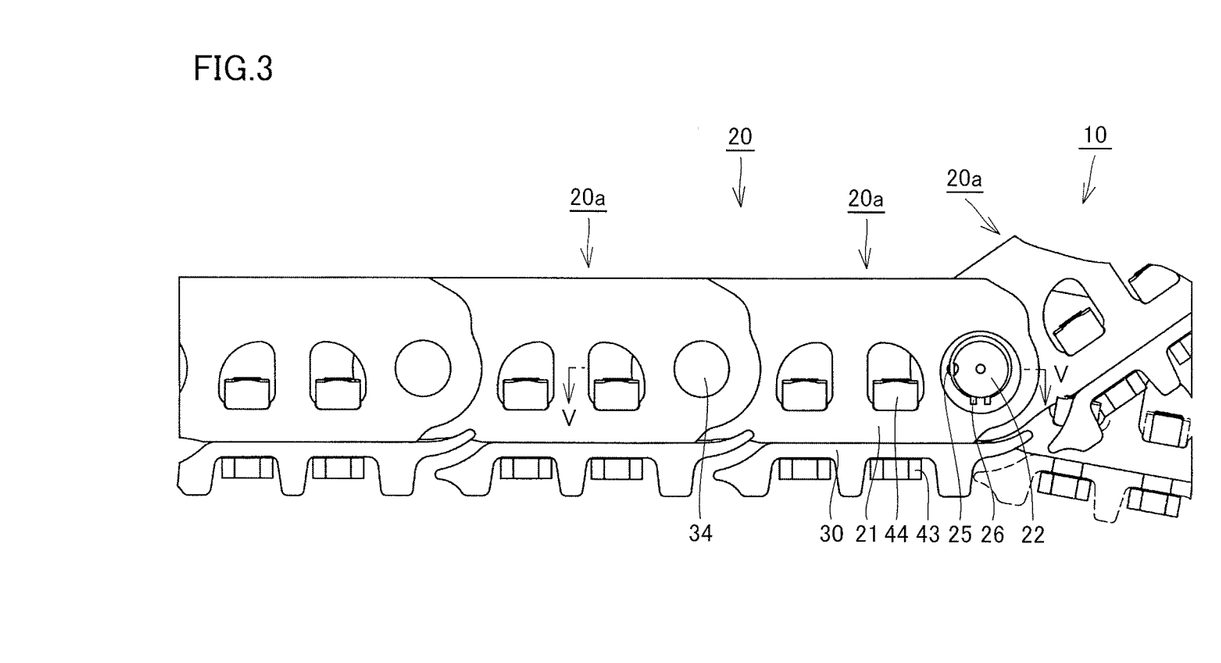
FIG. 3 is an enlarged view showing a crawler belt in a P1 portion in FIG. 2.

Referring to FIG. 2, lower traveling unit 2 is configured such that work vehicle (hydraulic excavator) 1 travels when a pair of crawler belts 10 disposed at the left and right sides are driven to rotate. Lower traveling unit 2 mainly includes crawler belts 10, a revolving apparatus 11, track frames 12, idler tumblers (idler rollers) 13, driving wheels (sprocket wheels) 14, carrier rollers 15, and track rollers 16.

Each of crawler belts 10 includes a crawler belt link chain 20, and track shoe plates 30 attached to crawler belt link chain 20. Revolving apparatus 11 is configured to be capable of revolving upper revolving unit 3 (FIG. 1), and is provided at the upper end portion of lower traveling unit 2. Track frames 12 are provided at both the ends of a center frame serving as a mount for revolving apparatus 11, so as to extend in the forward/backward direction of the vehicle.

Idler tumbler 13 is rotatably provided at the front end portion of track frame 12, and driving wheel 14 is provided at the rear end portion of track frame 12 so as to be driven and rotatable. The plurality of carrier rollers 15 are provided at the upper surface side of track frame 12, and the plurality of track rollers 16 are provided at the lower surface side of track frame 12. Further, an access ladder 17 is attached to lower traveling unit 2. It should be noted that access ladder 17 is not illustrated in FIG. 1.

Crawler belt 10 is wound around idler tumbler 13 and driving wheel 14. Further, crawler belt 10 is supported by carrier rollers 15 and track rollers 16 disposed between idler tumbler 13 and driving wheel 14. When crawler belt link chain 20 is engaged with driving wheel 14 and is driven, track shoe plate 30 is driven to rotate. Accordingly, crawler belt 10 is driven to rotate. In this way, lower traveling unit 2 autonomously travels.

Referring to FIG. 3 to FIG. 8, crawler belt link chain 20 of crawler belt 10 is constructed by coupling a plurality of crawler belt links 20a into an endless shape. The plurality of crawler belt links 20a have ground engaging surface (outer surface) sides to which track shoe plates 30 are fixed. From the outer surface side of each of track shoe plates 30, bolts 43 are inserted into through holes provided in track shoe plate 30 and crawler belt link 20a. At the ground non-engaging surface (inner surface) side of crawler belt link 20a, nuts 44 are screwed onto the tip portions of bolts 43. By these bolts 43 and nuts 44, track shoe plate 30 is fixed to the outer end surface of crawler belt link 20a.

One crawler belt link 20a in crawler belt link chain 20 has first crawler belt link 21 and second crawler belt link 31 constituting a pair. First crawler belt link 21 and second crawler belt link 31 are disposed in parallel with each other with a space interposed therebetween in a direction (crawler belt width direction) orthogonal to the coupling direction of crawler belt link chain 20. Further, first crawler belt link 21 and second crawler belt link 31 are formed in bilateral symmetry.

The plurality of crawler belt links 20a are pivotably supported by crawler belt pins 34 and are accordingly rotatably coupled to one another, thus forming crawler belt link chain 20 having a belt-like shape. Crawler belt links 20a disposed at both the ends of crawler belt link chain 20 having such a belt-like shape are coupled to each other using a pin designated as "master pin 22", thereby forming a chain having an endless shape.

At one end side in the longitudinal direction, first crawler belt link 21 of the present embodiment includes a first through hole 21a and second crawler belt link 31 includes a second through hole 31a. At the other end side, first crawler belt link 21 includes a third through hole 21c and second crawler belt link 31 includes a fourth through hole 31c. Master pin 22 is installed between the one end portion of first crawler belt link 21 and the one end portion of second crawler belt link 31. Both the end portions of master pin 22 are respectively fixed into first and second through holes 21a, 31a. The one end portion of each of first crawler belt link 21 and second crawler belt link 31 is disposed outwardly of one adjacent crawler belt link 20a. Here, the term "outwardly" is intended to mean a direction getting away in the width direction of the crawler belt (upward/downward direction in FIG. 5) from the center of the crawler belt in the width direction thereof.

Figure 5:
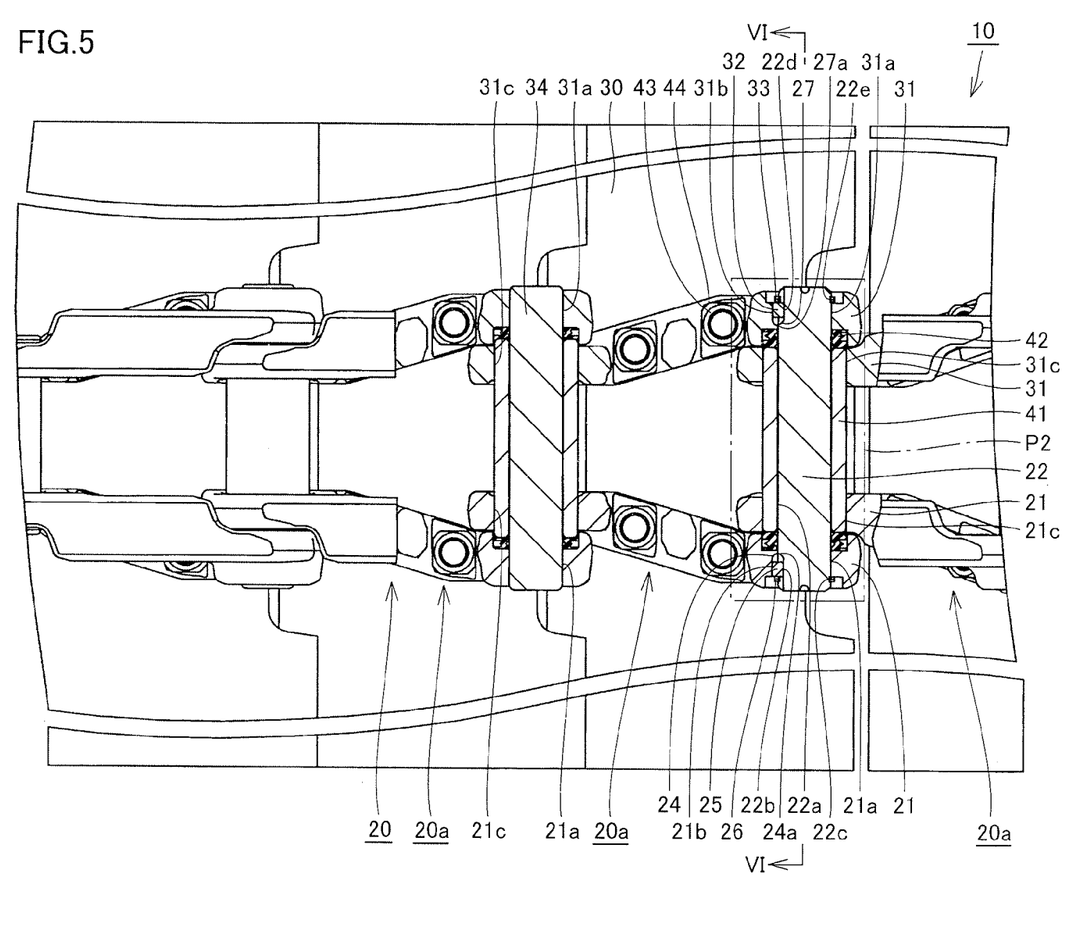
FIG. 5 is a partial cross sectional view taken along a line V-V of FIG. 3.
Figure 6:
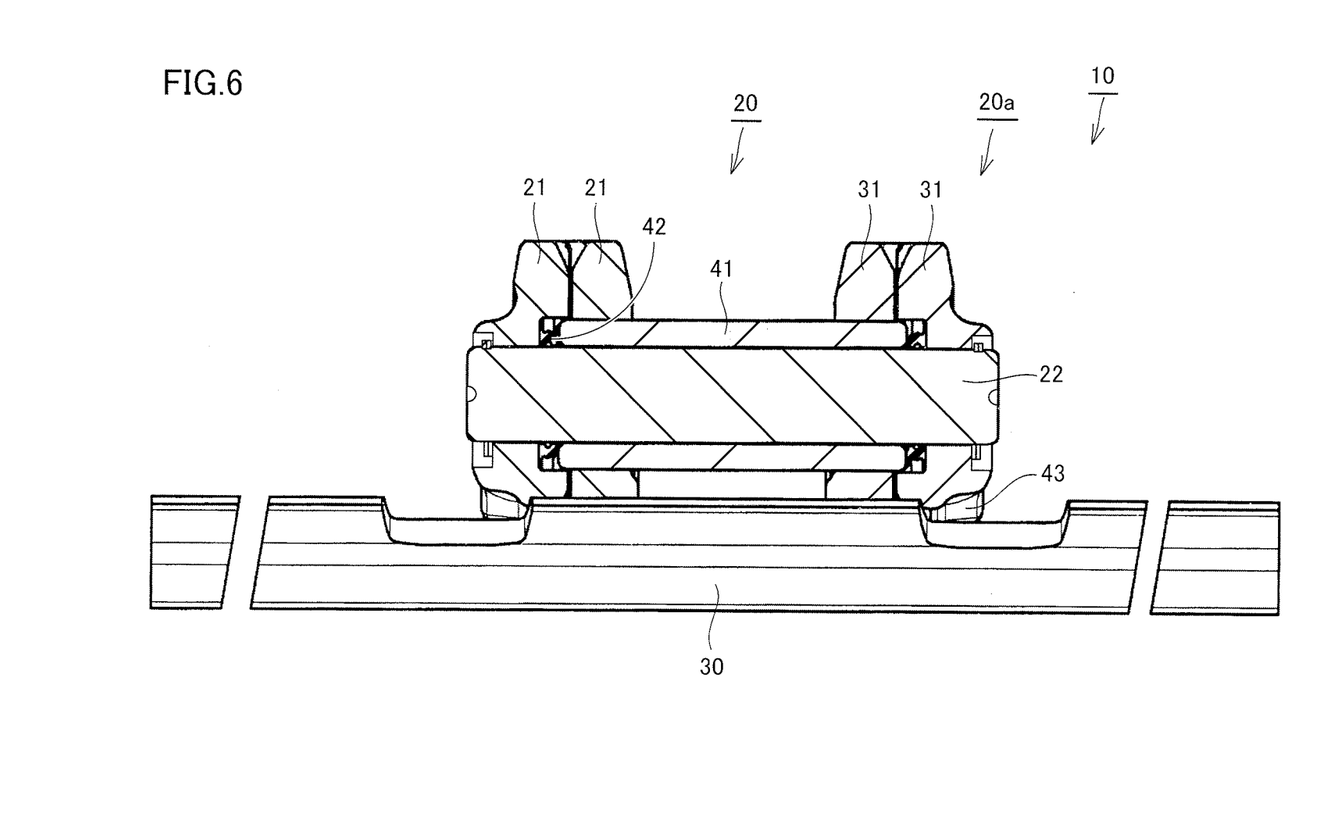
FIG. 6 is a cross sectional view taken along a line VI-VI of FIG. 5.

A crawler belt bushing 41 is disposed between the one end portion of first crawler belt link 21 and the one end portion of second crawler belt link 31. Crawler belt bushing 41 is rotatably fitted to master pin 22, externally. Crawler belt bushing 41 is fixed into third and fourth through holes 21c, 31c of one adjacent crawler belt link 20a. Accordingly, first crawler belt link 21, second crawler belt link 31, and the one adjacent crawler belt link 20a are rotatably coupled to one another via crawler belt bushing 41.

Further, crawler belt bushing 41 is formed to be engaged with teeth of driving wheel (sprocket wheel) 14. A seal ring 42 is disposed in a recess portion formed in the inner side surface of crawler belt link 20a, in contact with the end surface of crawler belt bushing 41.

Further, a crawler belt pin 34 is installed between the other end portion of first crawler belt link 21 and the other end portion of second crawler belt link 31. The other end portion of each of first crawler belt link 21 and second crawler belt link 31 is disposed inwardly of the other adjacent crawler belt link 20a.

A crawler belt bushing 41 is disposed between the other end portion of first crawler belt link 21 and the other end portion of second crawler belt link 31. Crawler belt bushing 41 is rotatably fitted to crawler belt pin 34, externally. Crawler belt bushing 41 is inserted and fixed into third through hole 21c of first crawler belt link 21 and fourth through hole 31c of second crawler belt link 31. Accordingly, first crawler belt link 21, second crawler belt link 31, and the other adjacent crawler belt link 20a are rotatably coupled to one another via crawler belt bushing 41.

It should be noted that the end portions of crawler belt pin 34 are press fitted into first and second through holes 21a, 31a of the other adjacent crawler belt link 20a, and are fixed thereto firmly through interference fit. For example, crawler belt pin 34 is press fitted into the other crawler belt link 20a at 160 kN (kilonewtons). On the other hand, in the crawler belt coupling apparatus of the present embodiment, the end portions of master pin 22 are press fitted into through hole 21a of the first crawler belt link and through hole 31a of second crawler belt link 31 with a force weaker than that for crawler belt pin 34, and is engaged therewith through intermediate fit rather than interference fit. Here, the term "intermediate fit" is intended to mean such fit that the maximum limit of size of the pin diameter of master pin 22 is larger than the minimum limit of size of the bore diameter of each of through holes 21a, 31a and the minimum limit of size of the pin diameter is smaller than the maximum limit of size of the bore diameter. The intermediate fit is also referred to as "transition fit". In other words, master pin 22 is fixed to such an extent that master pin 22 is made immovable by the fit between the outer circumferential surface of the pin and the inner circumferential surface of the through hole. For example, master pin 22 is press fitted into first and second crawler belt links 21, 31 at 16 kN.

Figure 8:
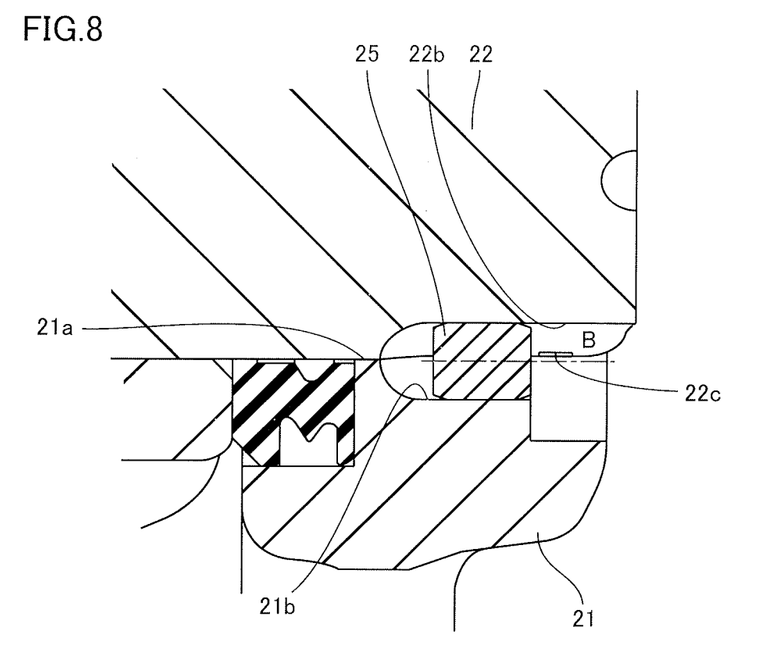
FIG. 8 is an enlarged view showing a major portion of FIG. 7 except the snap ring.

Referring to FIG. 5 and FIG. 8, the following describes a crawler belt coupling apparatus of the present embodiment. A crawler belt coupling apparatus is an apparatus provided at a link of an end portion of crawler belt link chain 20 having the belt-like shape with an end, so as to couple both the ends of the link chain to each other and accordingly obtain crawler belt link chain 20 having the endless shape. It should be noted that the crawler belt coupling apparatus of the present embodiment may be provided at at least one side of crawler belt link 20a, and may be provided at both sides of crawler belt link 20a.

The crawler belt coupling apparatus of the present embodiment includes first crawler belt link 21, master pin 22, first knock pin 25, and first snap ring 26.

First crawler belt link 21 has one end portion, the other end portion, and an oblique body portion disposed between the one end portion and the other end portion. First crawler belt link 21 has a first through hole 21a provided at the one end portion. First crawler belt link 21 has a first cutout 21b in an inner circumferential surface of first through hole 21a at an external side thereof. First cutout 21b is formed at the end portion of first crawler belt link 21 as shown in FIG. 8. First cutout 21b is in the form of a portion of a substantial cylinder extending in a direction of axis A of master pin 22 as described below.

Master pin 22 is a cylindrical component having a central axis A and to be inserted into first through hole 21a of first crawler belt link 21. Master pin 22 has a second cutout 22b and a first circumferential groove 22c in outer circumferential surface 22a. Second cutout 22b is formed at the end portion of master pin 22. Second cutout 22b is in the form of a portion of the substantial cylinder extending in the direction of axis A from the end surface of master pin 22.

From first cutout 21b and second cutout 22b, first recess 24 is formed. First cutout 21b and second cutout 22b face each other to form first recess 24. First recess 24 has an internal space having a cylindrical shape. First recess 24 has a central axis parallel to central axis A of master pin 22.

First knock pin 25 is disposed in first recess 24 such that one end surface thereof faces the opening of the recess. In other words, first knock pin 25 has a length shorter than the depth of first recess 24. First knock pin 25 has an axis B along the direction of axis A of master pin 22. Axis B corresponds to the central axis of first recess 24. In other words, first knock pin 25 is withdrawn/inserted in the same direction as the direction in which master pin 22 is withdrawn/inserted. First knock pin 25 is intermediate-fitted to first recess 24. In this way, first knock pin 25 is pressed against the inner circumferential surface of first recess 24 and is therefore less likely to come off from first recess 24. Further, first knock pin 25 is continuously in contact with first recess 24 at its outer circumferential surface in the circumferential direction. Further, first knock pin 25 is in contact with first recess 24 at its entire outer circumferential surface. Meanwhile, first snap ring 26 described below prevents knock pin 25 from coming off from first recess 24. Hence, the fit between first knock pin 25 and first recess 24 may be loose fit. In this case, by detaching first snap ring 26, first knock pin 25 can be readily detached from first recess 24.

First knock pin 25 is preferably disposed at the crawler belt pin 34 side of first through hole 21a engaging the other end portion of first crawler belt link 21. In other words, first cutout 21b is preferably disposed in first through hole 21a at a site closest to the through hole of the other end in first crawler belt link 21. First crawler belt link 21 is formed to extend from one end portion provided with first through hole 21a to the other end portion provided with crawler belt pin 34. In this shape, the thickness of the crawler belt pin 34 side relative to first through hole 21a is thicker than that of the side opposite to crawler belt pin 34. Therefore, when first cutout 21b for first knock pin 25 is provided at the crawler belt pin 34 side of link 21, stress acting on first crawler belt link 21 is not relatively large. Due to the above-described reason, cutout 21b is preferably provided at the crawler belt pin 34 side of crawler belt link 21, i.e., at a site closest to the other through hole in crawler belt link 21.

Figure 9:
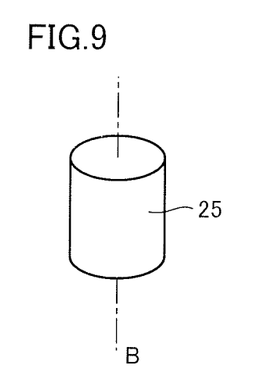
FIG. 9 is a schematic perspective view of a first knock pin in one embodiment of the present invention.

Referring to FIG. 9, first knock pin 25 has a cylindrical shape having central axis B. Further, first knock pin 25 has a uniform shape in cross section perpendicular to the direction of axis from one end to the other end thereof in the direction of axis B. First knock pin 25 has a height larger than the diameter thereof. In other words, the longitudinal direction of first knock pin 25 corresponds to the direction of axis B. In the crawler belt coupling apparatus of the present invention, the shape of knock pin 25 is not limited to the cylindrical shape. In this case, cutout 21b of crawler belt link 21 and cutout b of master pin 22 are provided to have shapes corresponding to the shape of knock pin 25. For example, knock pin 25 may have a shape of truncated cone.

Figure 4:
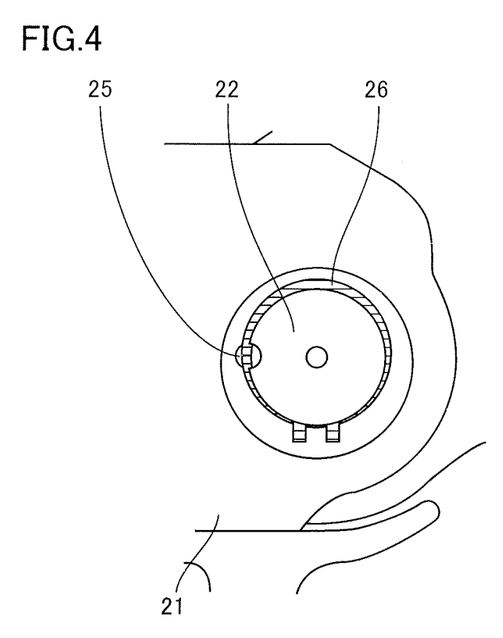
FIG. 4 is an enlarged view around a master pin in FIG. 3.

Referring to FIG. 3 to FIG. 8, first snap ring 26 has a C-like shape. First snap ring 26 is annular and has a portion provided with a cutout. By widening this cutout, the diameter of first snap ring 26 can be larger. First snap ring 26 is fitted into first circumferential groove 22c so as to overlap with the direction of withdraw of first knock pin 25 from first recess 24. In other words, as shown in FIG. 4, when the crawler belt coupling apparatus is viewed outwardly of crawler belt link 21, first snap ring 26 overlaps with first knock pin 25. Namely, first snap ring 26 prevents first knock pin 25 from coming off from first recess 24. In the present embodiment, first snap ring 26 is separated from the one end surface of first knock pin 25 with a space interposed therebetween, but they may be in contact with each other. One or more snap rings 26 may be provided. In the present embodiment, two snap rings 26 are arranged side by side and are fitted into first circumferential groove 22c.

Figure 7:
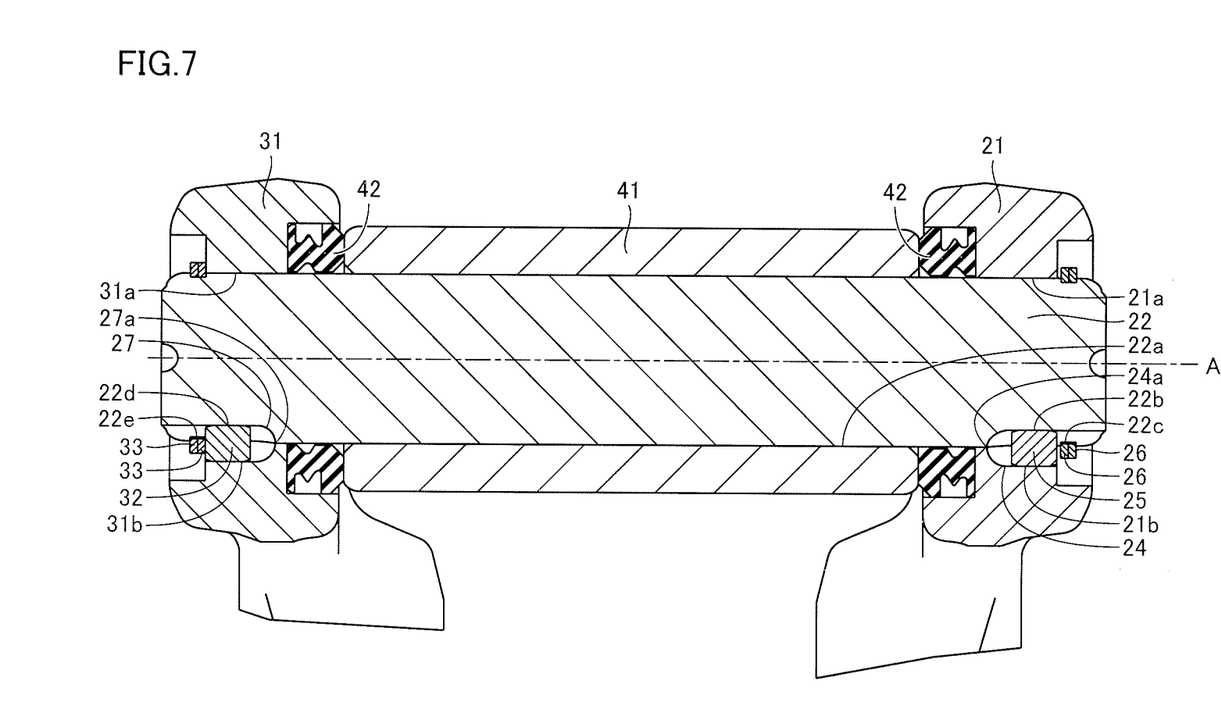
FIG. 7 is an enlarged view showing first and second crawler belt links and the like in a P2 portion in FIG. 5.

Further, the crawler belt coupling apparatus of the present embodiment may include a second crawler belt link 31, a second knock pin 32, and a second snap ring 33 as indicated by the crawler belt link at the left side of FIG. 7. First crawler belt link 21 is disposed at one end side of master pin 22, and second crawler belt link 31 is disposed at the other end side of master pin 22.

Second crawler belt link 31 has one end portion, the other end portion, and an oblique body portion disposed between the one end portion and the other end portion. Second crawler belt link 31 has a second through hole 31a provided at the one end portion. Master pin 22 is inserted into second through hole 31a. Second crawler belt link 31 has a third cutout 31b at an inner surface of second through hole 31a. Third cutout 31b is formed at the end portion of second crawler belt link 31. Third cutout 31b is formed to extend in the direction of axis of master pin 22.

Master pin 22 has a fourth cutout 22d and a second circumferential groove 22e in outer circumferential surface 22a. Fourth cutout 22d is formed at the end portion of master pin 22. Fourth cutout 22d is formed to extend in the direction of axis from the one end surface of master pin 22.

From third cutout 31b and fourth cutout 22d, second recess 27 is formed. Third cutout 31b and fourth cutout 22d face each other to form second recess 27. Second recess 27 preferably has an internal space having a cylindrical shape.

Second knock pin 32 is disposed in second recess 27. Second knock pin 32 has an axis along the direction of axis of master pin 22. Second knock pin 32 is preferably intermediate-fitted to second recess 27. In this way, second knock pin 32 is pressed against the inner circumferential surface of second recess 27 and is therefore less likely to come off from second recess 27. Further, second knock pin 32 is preferably continuously in contact with second recess 27 at its outer circumferential surface in the circumferential direction. Further, second knock pin 32 is preferably in contact with second recess 24 at its entire outer circumferential surface.

Second snap ring 33 has a C-like shape. Second snap ring 33 is annular and has a portion provided with a cutout. By widening this cutout, the diameter of second snap ring 33 can be larger. Second snap ring 33 is fitted into second circumferential groove 22e so as to sandwich second knock pin 32 between second snap ring 33 and bottom portion 27a of second recess 27. Second snap ring 33 is disposed relative to second crawler belt link 31 in the direction along the direction of axis of the master pin. Second snap ring 33 is preferably in contact with second knock pin 32. One or more second snap rings 33 may be provided. In the present embodiment, two second snap rings 33 are arranged side by side and are fitted into second circumferential groove 22e.

The following describes a manner of decoupling of the crawler belt coupling apparatus of the present embodiment.

Figure 10:
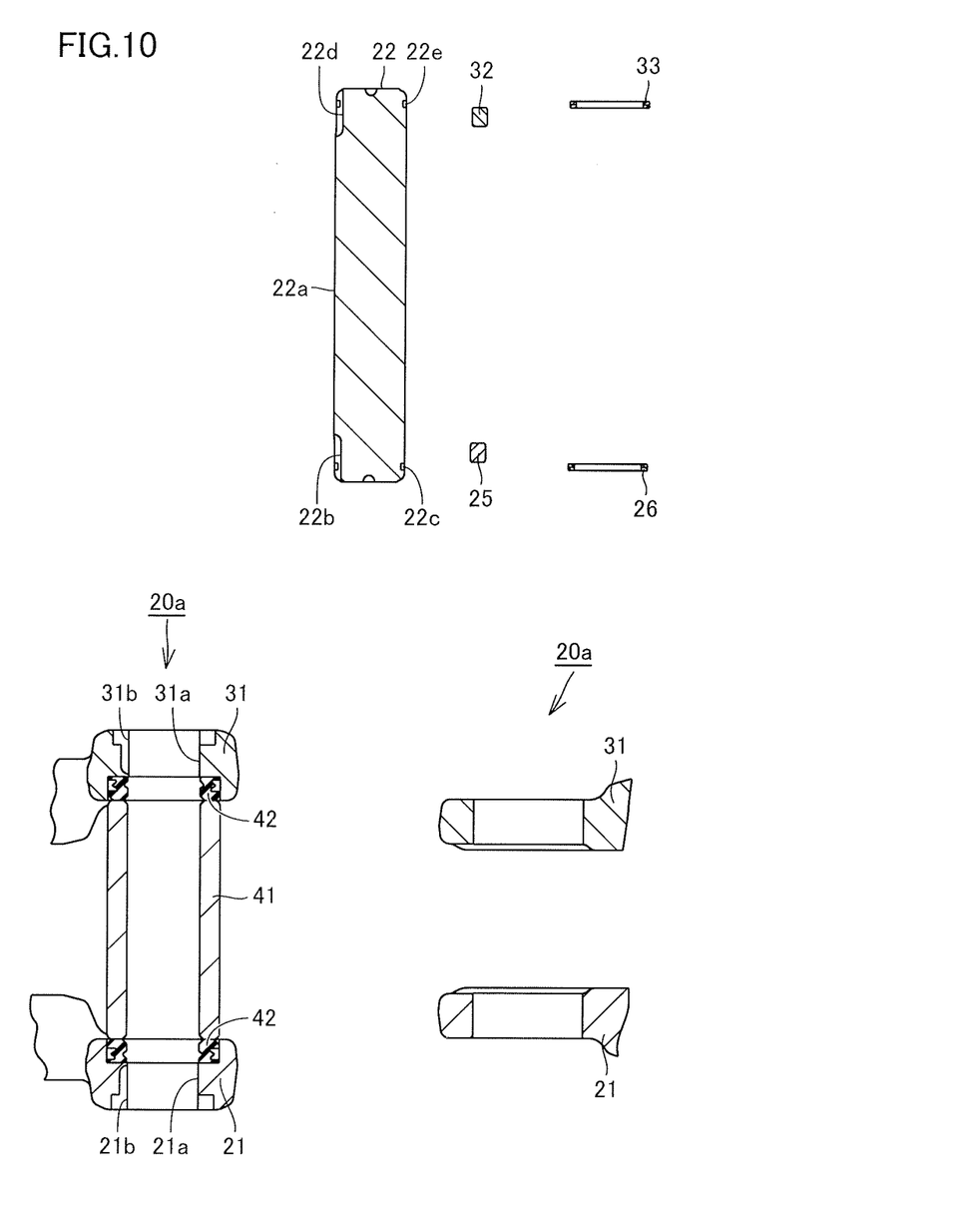
FIG. 10 shows a state in which the crawler belt coupling apparatus is decoupled in one embodiment of the present invention.

Referring to FIG. 5 and FIG. 10, the decoupling of the crawler belt coupling apparatus of the present embodiment is attained by removing master pin 22 from first crawler belt link 21, second crawler belt link 31, and the one crawler belt link 20a adjacent to first crawler belt link 21 and second crawler belt link 31.

Master pin 22 is removed in the following procedure. First, by widening the C-like shape of each of the cutouts of first snap ring 26 and second snap ring 33, first snap ring 26 is detached from first circumferential groove 22c and second snap ring 33 is detached from second circumferential groove 22e. Next, by pulling out first snap ring 26 and second snap ring 33 from the end portion of master pin 22, first snap ring 26 and second snap ring 33 are removed from master pin 22.

Next, first knock pin 25 is removed from first recess 24 and second knock pin 32 is removed from second recess 27. In this state, master pin 22 is pulled out to either of first crawler belt link 21 and second crawler belt link 31. In this way, the decoupling of the crawler belt coupling apparatus is attained.

Re-coupling of the crawler belt coupling apparatus can be attained in a procedure reverse to the above-described procedure. In other words, in the crawler belt coupling apparatus of the present embodiment, by detaching/attaching first knock pin 25, first snap ring 26, second knock pin 32, and second snap ring 33, master pin 22 can be detached/attached from/to first crawler belt link 21 and second crawler belt link 31. Thus, coupling and decoupling of crawler belt 10 can be performed without using a pressing machine, thereby achieving improved workability in detaching/attaching crawler belt 10.

It should be noted that by removing either first knock pin 25 and first snap ring 26 or second knock pin 32 and second snap ring 33, master pin 22 can be pulled out, so that the decoupling may be performed by removing either of them.

Figure 11:
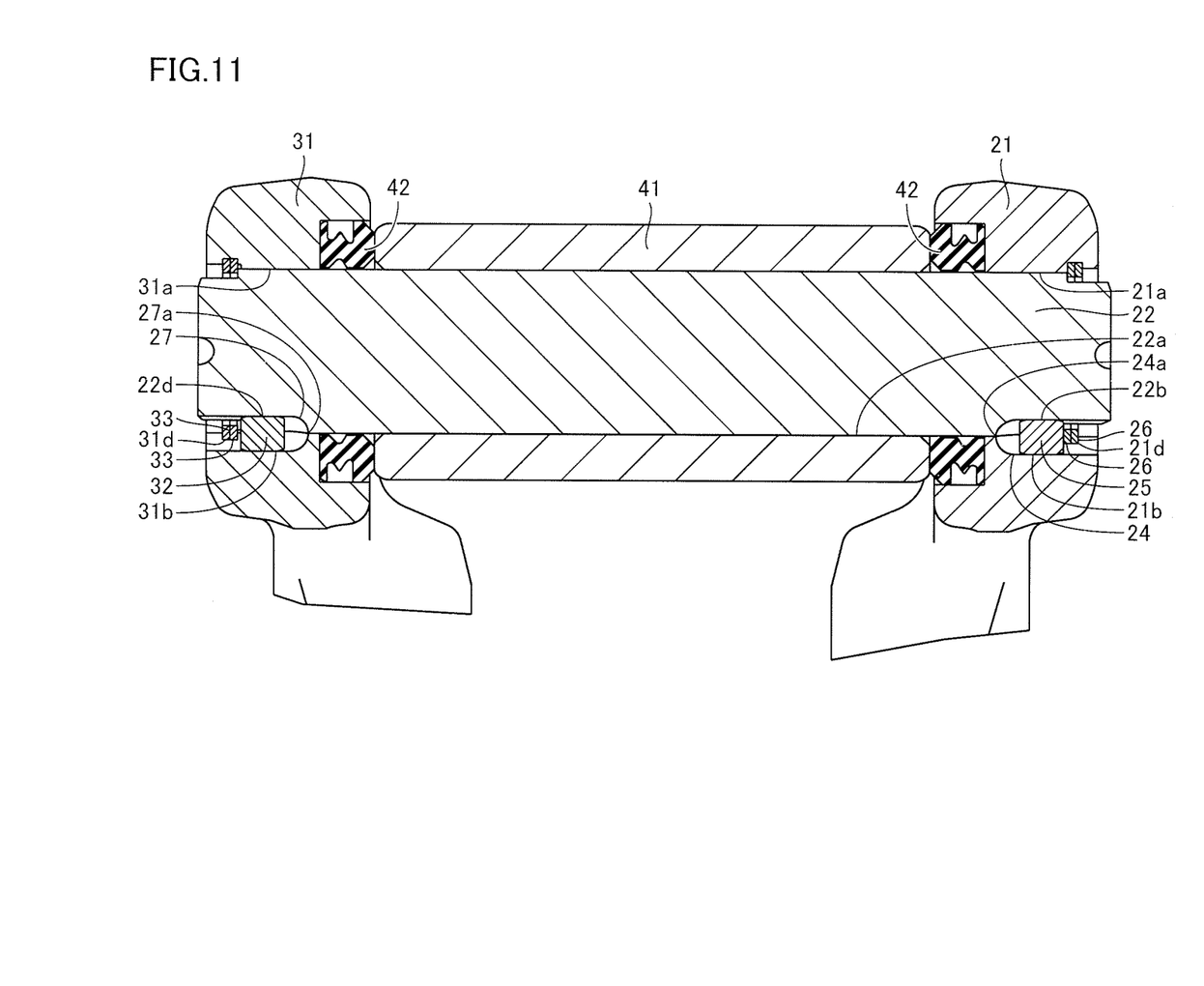
FIG. 11 is a cross sectional view showing a crawler belt coupling apparatus in another embodiment of the present invention.
Figure 12:
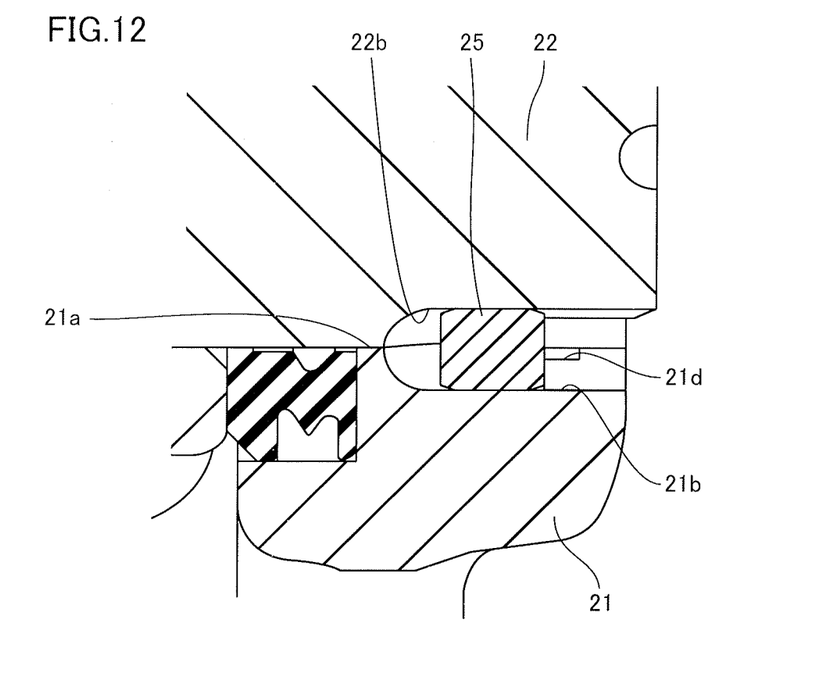
FIG. 12 is an enlarged view showing a major portion of FIG. 11 except the snap ring.

In the above-described embodiment, first circumferential groove 22c is provided in the outer circumference of master pin 22 for locking of the snap rings, but may be provided in the inner circumferential surface of through hole 21a of first crawler belt link 21 as shown in FIG. 11 and FIG. 12 (first circumferential groove 21d). In this embodiment, no circumferential groove, which might cause concentration of stress, is in the outer circumference of master pin 22. This results in excellent reliability of master pin 22. Further, second circumferential groove 31d may be provided in the inner circumferential surface of second through hole 31a of second crawler belt link 31.

The following describes function and effect of the crawler belt coupling apparatus of the present embodiment.

According to the crawler belt coupling apparatus of the present embodiment, first snap ring 26 has the C-like shape, so that first snap ring 26 can be readily detached/attached from/to master pin 22 or first crawler belt link 21. Further, master pin 22 is not fixed to first crawler belt link 21 by interference fit unlike an ordinary crawler belt pin. Hence, by detaching/attaching first snap ring 26, master pin 22 can be relatively readily detached/attached from/to first crawler belt link 21. Accordingly, master pin 22 can be detached/attached from/to first crawler belt link 21 without using a pressing machine. In this way, workability can be improved in detaching/attaching crawler belt 10.

Further, first knock pin 25 is disposed in first recess 24 constructed of first cutout 21b of first crawler belt link 21 and second cutout 22b of master pin 22. Accordingly, first knock pin 25 can be in surface contact with first cutout 21b and second cutout 22b in first recess 24. Hence, the fit of master pin 22 is intermediate fit but master pin 22 is fixed so as not to rotate relative to first crawler belt link 21. Further, first knock pin 25 can be suppressed from being brought into contact with one of first cutout 21b and second cutout 22b. This leads to suppression of wear of first recess 24. Accordingly, a space can be suppressed from being formed between first knock pin 25 and each of first and second cutouts 21b, 22b, thereby suppressing master pin 22 from falling off from first crawler belt link 21.

Further, first snap ring 26 is provided at a location to prevent first knock pin 25 from getting out of first recess 24. In this way, first snap ring 26 can prevent first knock pin 25 from coming off from first recess 24. This prevents first knock pin 25 from coming off and prevents master pin 22 from rotating relative to first crawler belt link 21.

Further, according to the crawler belt coupling apparatus of the present embodiment, first circumferential groove 22c is provided in outer circumferential surface 22a of master pin 22, and first snap ring 26 is fitted into first circumferential groove 22c. Alternatively, circumferential groove 21d is provided in the inner circumferential surface of through hole 21a of crawler belt link 21, and snap ring 26 is fitted into circumferential groove 22c. Accordingly, first snap ring 26 can be securely fixed at a predetermined location, so that master pin 22 can be prevented from falling off.

Further, according to the crawler belt coupling apparatus of the present embodiment, master pin 22 is engaged with first through hole 21a of first crawler belt link 21 through intermediate fit. Accordingly, master pin 22 can be detached/attached from/to first crawler belt link 21 without using a pressing machine.

Further, according to the crawler belt coupling apparatus of the present embodiment, first crawler belt link 21 is disposed at one end of master pin 22 and second crawler belt link 31 is disposed at the other end of master pin 22. By detaching/attaching second snap ring 33, master pin 22 can be detached/attached from/to second crawler belt link 31. Accordingly, second knock pin 32 can be detached/attached from/to second crawler belt link 31 without using a pressing machine. Hence, workability can be improved in detaching/attaching crawler belt 10 at both first crawler belt link 21 and second crawler belt link 31.

Further, second knock pin 32 is disposed in second recess 27 constructed of third cutout 31b of second crawler belt link 31 and fourth cutout 22d of master pin 22. Accordingly, second knock pin 32 can be in surface contact with third cutout 31b and fourth cutout 22d in second recess 27. Hence, the fit of master pin 22 is intermediate fit but master pin 22 is fixed so as not to rotate relative to second crawler belt link 31. Further, second knock pin 32 can be suppressed from being brought into contact with one of third cutout 31b and fourth cutout 22d. This leads to suppression of wear of second recess 27. Accordingly, a space can be suppressed from being formed between second knock pin 32 and each of third and fourth cutouts 31b, 22d, thereby suppressing master pin 22 from falling off from second crawler belt link 31.

Further, second snap ring 33 is fitted in a path via which second knock pin 32 is withdrawn from the second recess. In this way, second snap ring 33 prevents second knock pin 32 from coming off from second recess 27. Accordingly, second knock pin 32 can be prevented from coming off and master pin 22 can be prevented from rotating relative to second crawler belt link 31.

In the crawler belt coupling apparatus of the present embodiment, first knock pin 25 is disposed at the crawler belt pin 34 side of first through hole 21a (i.e., side closer to the through hole other than first through hole 21a in first crawler belt link 21a). At the crawler belt pin 34 side of first through hole 21a, stress acting on first crawler belt link 21 is smaller than that at the side opposite to crawler belt pin 34. Accordingly, by disposing first knock pin 25 at the crawler belt pin 34 side of first through hole 21a, cracks can be suppressed from being generated around first knock pin 25 due to stress.

In the crawler belt coupling apparatus of the present embodiment, first knock pin 25 has a uniform shape in cross section perpendicular to the direction of axis from one end to the other end thereof in the direction of axis. Accordingly, first knock pin 25 can be uniformly in contact with first recess 24 in the direction of axis. This leads to suppression of wear of first recess 24.

In the crawler belt coupling apparatus of the present embodiment, first knock pin 25 has a cylindrical shape. The cylindrical shape allows for surface contact with first recess 24. This leads to suppression of wear of first recess 24.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be particularly advantageously applied to a crawler belt coupling apparatus including a master pin.

REFERENCE SIGNS LIST

1: work vehicle; 2: lower traveling unit; 3: upper revolving unit; 4: work implement; 5: cab; 6: engine compartment; 7: counter weight; 10: crawler belt; 11: revolving apparatus; 12: track frame; 13: idler tumbler; 14: driving wheel; 15: carrier roller; 16: track roller; 17: access ladder; 20: crawler belt link chain; 20a: crawler belt link; 21: first crawler belt link; 21a: first through hole; 21b: first cutout; 21c: third through hole; 21d: first circumferential groove; 22: master pin; 22a: outer circumferential surface; 22b: second cutout; 22c: first circumferential groove; 22d: fourth cutout; 22e: second circumferential groove; 24: first recess; 24a, 27a: bottom portion; 25: first knock pin; 26: first snap ring; 27: second recess; 30: track shoe plate; 31: second crawler belt link; 31a: second through hole; 31b: third cutout; 31c: fourth through hole; 32: second knock pin; 33: second snap ring; 34: crawler belt pin; 41: crawler belt bushing; 42: seal ring; 43: bolt; 44: nut; A: central axis of master pin; B: central axis of first knock pin.

The invention claimed is:

1. A crawler belt coupling apparatus for providing an endless crawler belt by coupling a belt-like crawler belt having a series of crawler belt links, comprising:

a first crawler belt link having a first through hole and a first cutout in an inner circumferential surface of said first through hole;

a master pin inserted in said first through hole of said first crawler belt link and having a second cutout in an outer circumferential surface thereof;

a first recess constructed of said first and second cutouts and having an opening at an end portion of said first through hole;

a first knock pin disposed in said first recess such that one end surface thereof faces said opening; and a first snap ring having a C-like shape and disposed to be separated from said one end surface of said first knock pin with a space therebetween or disposed in abutment with said one end surface, wherein said master pin is engaged with said first through hole through intermediate fit.

2. The crawler belt coupling apparatus according to claim 1, comprising a first circumferential groove provided in the outer circumferential surface of said master pin, wherein said first snap ring is provided in said first circumferential groove.

3. The crawler belt coupling apparatus according to claim 2, comprising:

a second crawler belt link having a second through hole into which said master pin is inserted, having a third cutout in an inner circumferential surface of said second through hole, and forming a pair with said first crawler belt link, said first crawler belt link being disposed at one end side of said master pin, said second crawler belt link being disposed at the other end side of said master pin, said master pin having a fourth cutout and a second circumferential groove in said outer circumferential surface;

a second knock pin disposed in a second recess that is constructed of said third and fourth cutouts and that has an opening at an end portion of said second through hole, said second knock pin being disposed such that the other end surface thereof faces said opening; and a second snap ring having a C-like shape and disposed to be separated from the other end surface of said second knock pin with a space therebetween or disposed in abutment with the other end surface.

4. The crawler belt coupling apparatus according to claim 1, wherein said first through hole is disposed at one end side of said first crawler belt link in a longitudinal direction, a third through hole is disposed at the other end side of said first crawler belt link in the longitudinal direction, and said first recess is provided at a site closest to said third through hole of said first through hole.

5. The crawler belt coupling apparatus according to claim 1, wherein said first knock pin has a uniform shape in cross section perpendicular to the direction of axis from one end to the other end thereof in the direction of axis.

6. The crawler belt coupling apparatus according to claim 1, wherein said first knock pin has a cylindrical shape.

* * * * *